United States Patent [19]
Kawai

[11] Patent Number: 4,821,607
[45] Date of Patent: Apr. 18, 1989

[54] SHIFT ACTUATOR IN AUTOMATIC SHIFT MECHANISM OF GEARED TRANSMISSIONS

[75] Inventor: Shunichi Kawai, Nagoya, Japan

[73] Assignee: Aisin Seiki Kabushiki Kaisha, Kariya, Japan

[21] Appl. No.: 134,192

[22] Filed: Dec. 17, 1987

[30] Foreign Application Priority Data

Dec. 18, 1986 [JP] Japan .................................. 61-300157

[51] Int. Cl.⁴ .................................................. B60K 41/04
[52] U.S. Cl. ...................................... 74/866; 74/336 R; 74/473 R; 74/475
[58] Field of Search ................. 74/336 R, 473 R, 475, 74/866

[56] References Cited

U.S. PATENT DOCUMENTS

| | | | |
|---|---|---|---|
| 2,399,567 | 4/1946 | Peterson et al. | 74/866 X |
| 2,522,228 | 9/1950 | Hukill | 74/335 X |
| 2,548,761 | 4/1951 | Armantrout | 74/477 X |
| 3,530,668 | 9/1970 | Siebers et al. | 74/866 X |
| 3,688,609 | 9/1972 | Friedline | 74/866 |
| 4,023,443 | 5/1977 | Usui et al. | 74/336 R X |
| 4,266,447 | 5/1981 | Heess et al. | 74/858 |
| 4,520,694 | 6/1985 | Eschrich | 74/866 X |
| 4,662,242 | 5/1987 | Atkinson et al. | 74/701 |

FOREIGN PATENT DOCUMENTS 879841 12/1942 France .................................. 74/335

Primary Examiner—Allan D. Herrmann
Attorney, Agent, or Firm—Burns, Doane, Swecker & Mathis

[57] ABSTRACT

A shift actuator in an automatic shift mechanism of a geared transmission for an automotive vehicle includes a shift rod mounted in a casing so as to slide freely in mutually opposing directions and coupled to a fork shaft to acutate the same by sliding in either of the directions, thereby effecting a gear shift, actuating means attached to the shift rod for urging the shift rod in either of the directions by hydraulic pressure switched by a changeover valve, and a CPU for switching the changeover valve. Hydraulic pressure is switchingly applied to the actuating means by the changeover valve in response to a command from the CPU, thereby urging the shift member coupled to the fork shaft in the shift direction intended. As a result, when synchronization with the rotational speed of the engine is achieved, the fork shaft automatically slips into in a desired shift postion.

29 Claims, 9 Drawing Sheets

FIG.6
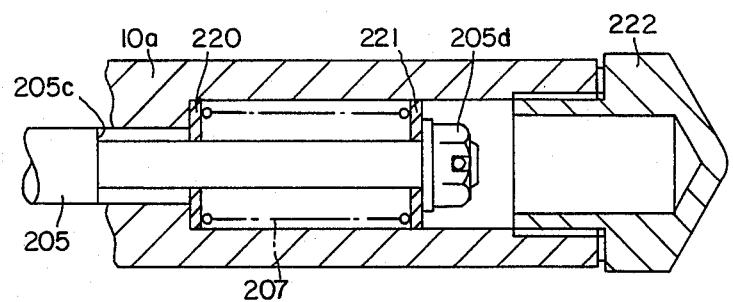
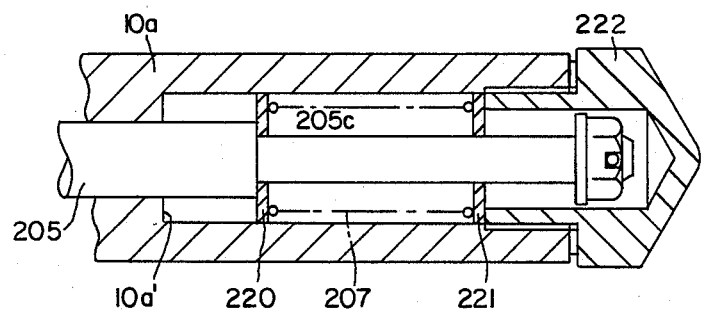
FIG.7

SHIFT ACTUATOR IN AUTOMATIC SHIFT MECHANISM OF GEARED TRANSMISSIONS

BACKGROUND

This invention relates to shift actuator in a shift mechanism of a geared transmission capable of shifting to overdrive automatically.

Geared manual transmissions have long come equipped with an overdrive shift mechanism. In a transmission with five forward speeds, for example, fifth speed is overdrive. Overdrive enables fuel consumption to be improved by making the gear ratio less than one at high traveling speeds.

In a manual transmission, however, the state of the art is such that overdrive involves a complicated shifting operation and therefore is used only infrequently. Though use of overdrive in, say, a long distance truck can result in a considerable fuel savings, overdrive is not utilized very often for the abovementioned reason. In order to foster the use of overdrive, a geared transmission in which only the shift to overdrive is automated has been developed, as set forth in the specification of U.S. Pat. No. 2,548,761.

SUMMARY OF THE DISCLOSURE

This transmission equipped with the conventional mechanism for shifting to overdrive possesses a certain shortcoming. Specifically, an auxiliary transmission, namely an overdrive transmission, is connected to the main body of the transmission, and it is so arranged that the automatic shift to overdrive is effected in the overdrive transmission without performing an automatic shift in the transmission main body. Furthermore, the overdrive transmission employs a one-way clutch. Consequently, torque cannot be transmitted at the time of engine braking (namely at the time of negative drive), as a result of which engine braking will not function.

The present invention has been devised in order to solve the aforementioned problem possessed by the conventional mechanism for automatically shifting to overdrive in a geared manual transmission. It is an object of the present invention to provide a shift actuator through which it is possible to realize an automatic shift mechanism of a geared transmission capable of effecting a smooth shift to overdrive while allowing engine braking to function at all times when making an automatic shift to overdrive.

Still further objects of the present invention will become apparent in the entire disclosure.

According to the present invention, the foregoing object is attained by providing a shift actuator in an automatic shift mechanism of a geared transmission for an automotive vehicle, comprising:

a casing;

a shift member arranged in the casing so as to slide freely in opposing directions and coupled to a fork shaft for actuating the fork shaft by sliding in either of said directions, thereby effecting a gear shift;

actuating means connected to said shift member for urging said shift member in either of said directions by hydraulic pressure; and control means for switching the hydraulic pressure.

In the shift actuator of the invention, the changeover valve changes over hydraulic pressure to apply the same to the actuating means in response to a shift command from the control means, the actuating means is urged to slide the shift member in the shifting direction, and the fork shaft coupled to the shift member is actuated to effect a gear shift.

More specifically, if a command from the control means is indicative of an up-shift, hydraulic pressure is applied to the actuating means by switching the changeover means, thereby urging the shift member in one direction. As a result, when synchronization with the rotational speed of the engine is achieved, the shift member is slid in the up-shift direction to place the fork shaft in the neutral position, then the fork shaft is urged further in the upshift direction so that the shift member is slid to the up-shift position when synchronization with the rotational speed of the engine is achieved, thereby placing the fork shaft in the up-shift position.

If a command from the control means is indicative of a down-shift, on the other hand, hydraulic pressure is applied in a direction opposite that for the up-shift by switching the changeover means, thereby urging the shift member in the other direction. As a result, when synchronization with the rotational speed of the engine is achieved, the shift member is slid in the down-shift direction to place the fork shaft in the neutral position, then the fork shaft is urged further in the down-shift direction so that the shift member is slid to the down-shift position when synchronization with the rotational speed of the engine is achieved, thereby placing the fork shaft in the down-shift position.

Thus, as set forth above, the present invention is based upon an arrangement in which hydraulic pressure is switchingly applied to the actuating means by the changeover valve in response to a command from the control means, thereby urging the shift member coupled to the fork shaft in the shift direction intended. As a result, when synchronization with the rotational speed of the engine is achieved, the fork shaft slips into the neutral position automatically and is capable of being placed in the desired shift position. Thus, it is unnecessary to use a one-way clutch, as in the conventional automatic shift mechanism. As a result, hazards such as a failure to transmit torque at the time of negative drive and failure of engine braking to function are eliminated. It is also to possible to perform automatic shifting smoothly.

Preferred embodiments of the invention will be summarized below:

The shift member comprises a shift rod arranged so as to slide freely axially thereof inside the casing, the shift rod being connected with a distal end of a lever coupled to the forkshaft. The actuating means comprises piston means operatively connected to said shift member and actuated by the hydraulic pressure, the piston means defining first and second pressure chambers.

The control means comprises changeover valve means for switching the hydraulic pressure. The changeover valve means comprises first and second solenoid valves connected respectively to said first and second pressure chambers for switchingly connecting a pressure source to either of said first and second pressure chambers. Preferably, the pressure source may be a vacuum source for quick responsivility, e.g., vacuum pump. The first and second pressure chambers may be partitioned from each other by a plate fixed to one end of said shift rod and a diaphragm attached to said plate, said plate being urged in mutually opposing directions by the hydraulic pressure applied thereto. The shift rod has positioning means for positioning said shift rod at a neutral position. The positioning means comprises a pair of plates penetrated by said shift rod and freely slidable in an axial direction of the shift rod, and a spring interposed between said plates for urging said plates away from each other, said pair of plates being restricted relative to the casing so as to define the neutral position of the shift rod.

The lever connected to said shift rod has a distal end portion pivotally supported on a head provided on said shift rod, and a base portion fixed to one end of a shaft arranged rockable about its axis in the casing, a further lever engaged with the fork shaft being attached to the other end of said shaft. The head is preferably provided on the central portion of said shift rod.

The fork shaft is a second highest speed—highest speed fork shaft, wherein the highest speed may be overdrive, e.g., a fifth speed.

A speed-change switch is arranged on both sides of the head, said shift rod contacting one of the speed-change switches to turn said switch on when said shift rod slides in either direction.

The control means comprises a computer for switching the hydraulic pressure on the basis of signals indicative of vehicle velocity and accelerator opening. When said vehicle velocity is greater than a prescribed velocity and, moreover, accelerator opening is less than a prescribed first accelerator opening, said computer outputs a signal to open a first solenoid valve to connect a vacuum source to said first pressure chamber, thereby sliding said shift rod to a high-speed side, and when said vehicle velocity is less than a prescribed velocity and, moreover, accelerator opening is greater than a prescribed second accelerator opening, said computer outputs a signal to open a second solenoid valve to connect the vacuum source to said second pressure chamber, thereby sliding said shift rod to a low-speed side.

The fork shaft is actuatable independently of a fork shaft establishing at least one (e.g., two or more) speed lower than the second highest speed, wherein the lower speed may include typically three forward speeds and one reverse speed. The shift actuator further includes means for releasing operative coupling of the shift lever from said fork shaft establishing the lower speed, and for operatively coupling the shift lever with said shift actuator. And the shift actuator further includes sensing means for said releasing of the shift lever from said fork shaft, said sensing means supplying a sensed signal to said control means. The shift actuator includes a neutral position, too. The sensing means comprises a switch actuatable by a shift and select lever shaft upon its release from the coupling state with said fork shaft establishing the lower speed. The shift actuator may include feeling means for feeling a shift lever position establishing the second highest speed. The feeling means comprises an engaging member with a shift inner lever of said releasing means, and a ball notch indicative of the second highest speed.

Other features and advantages of the present invention will be apparent from the following description taken in conjunction with the accompanying drawings.

BRIEF DESCRIPTION OF THE DRAWINGS

FIG. 6 is an operational view illustrating operation of a shift rod at the time of a shift to fourth speed in accordance with the embodiment;

FIG. 7 is an operational view illustrating operation of the shift rod at the time of a shift to fifth speed in accordance with the embodiment;

DETAILED DESCRIPTION OF THE PREFERRED EMBODIMENTS

A first embodiment of the present invention will now be described with reference to the drawings.

Figure 1:
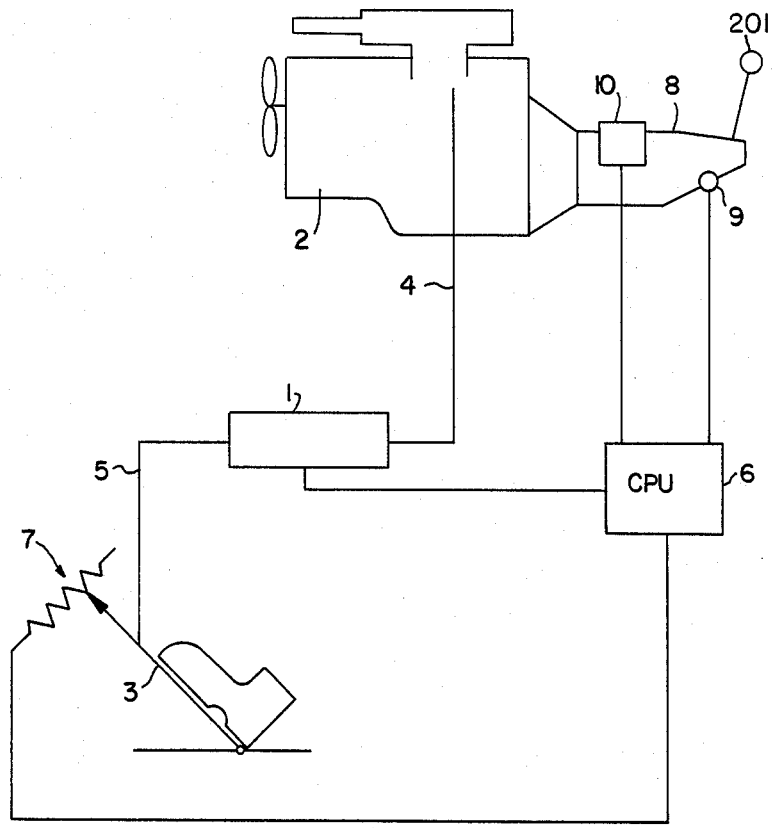
FIG. 1 is a block diagram illustrating an automatic shift mechanism of a geared transmission in which a shift actuator in accordance with the invention is a component.

FIG. 1 is a block diagram illustrating an automatic shift mechanism of a geared transmission in which a shift actuator in accordance with the invention is a component. The shift actuator, indicated at numeral 10, is provided on a transmission 8. A throttle actuator 1 is interposed between an engine 2 and an accelerator pedal 3 of the vehicle having the transmission and is coupled to the engine throttle and the accelerator pedal 3 by wires 4, 5, respectively. The throttle actuator 1 is connected to a CPU 6 serving as a control means. The latter controls the operation of the throttle actuator 1 on the basis of a signal from an accelerator opening sensor 7 and a signal from a vehicle velocity sensor 9 mounted on a transmission 8. The CPU 6 is also connected to the shift actuator 10 for controlling the operation thereof.

Figure 2:
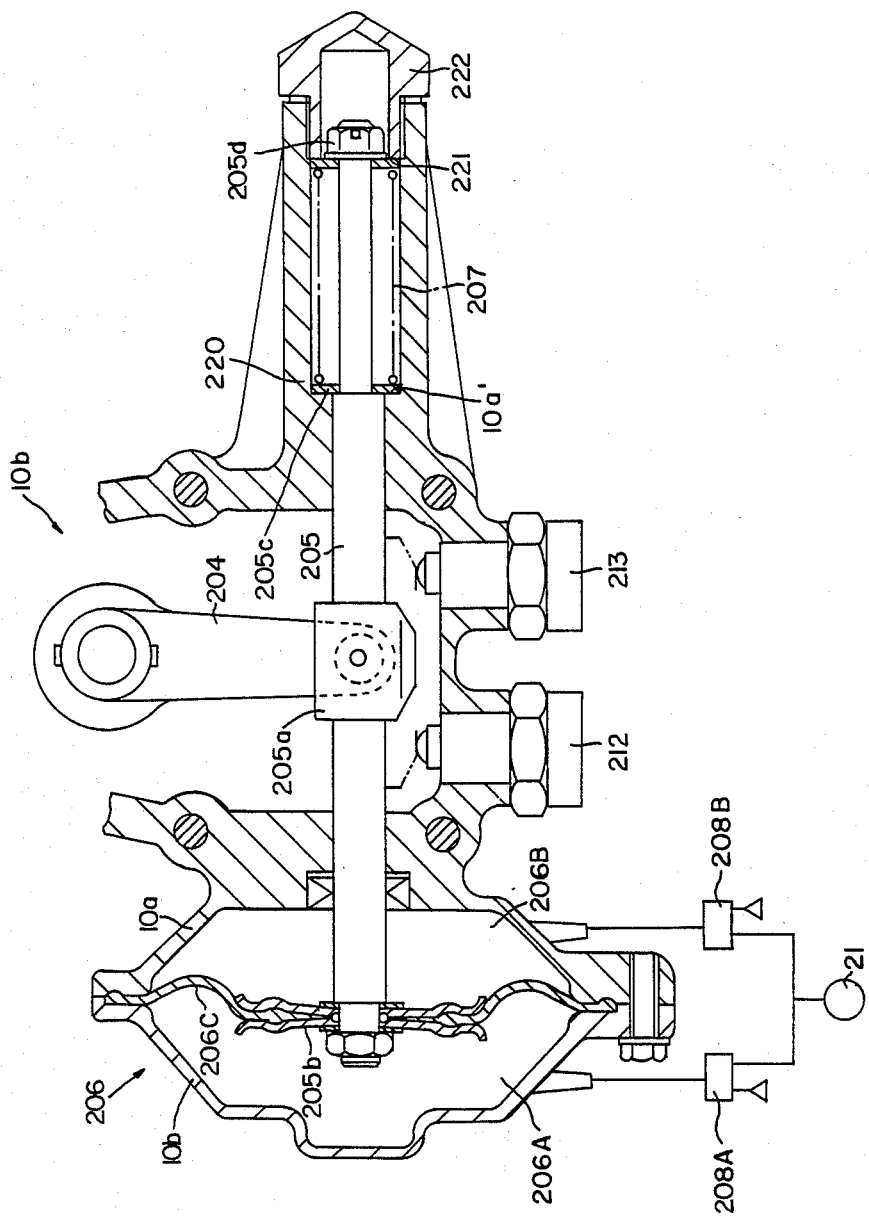
FIG. 2 is a longitudinal section illustrating an embodiment of the invention.

FIG. 2 is a view illustrating the components 10b of the shift actuator 10 shown in FIG. 1 for shifting between fourth speed and fifth speed (overdrive). The shift actuator 10 includes a lever 204 coupled to a fourth speed—fifth speed fork shaft, and a shift rod (shift member) 205 having a head 205a fixed to its central portion. The distal end of the lever 204 is coupled to the head 205a so that the lever 204 will rock back and forth as the shift rod 205 reciprocates. The left end of the shift rod 205 in FIG. 2 is provided with an actuator 206 (actuating means) comprising pressure chambers 206A, 206B delimited in a space, which is formed between a body 10a and a cover 10b, by a plate 205b fixed to one end of the shift rod 205 which defines a piston arrangement or means for moving said rod, and a diaphragm 206c having an inner periphery fixed to the plate 205b and an outer periphery clamped between the body 10a and the cover 10b. The pressure chamber 206A is connected to a vacuum pump 21 via a fourth-speed solenoid valve (changeover valve) 208A, and the pressure chamber 206B is connected to the vacuum pump 21 via a fifth-speed solenoid valve (changeover valve) 208B.

The right-end portion of the shift rod 205 is formed to include a step 205c. Two plates 220, 221 are loosely fitted on the shift rod 205, with their respective centers penetrated thereby, between the step 205c and a nut 205d screwed onto the distal or right end of the rod 205. A neutral-return spring 207 is fitted between the plates 220, 221 and urges the plate 220 against the step 205c of the shift rod 205 and the plate 221 against the nut 205d. The spring 207 also urges the plate 220 against a step 10a' formed in the body 10a and urges the plate 222 against a plug 222 screwed in the body 10a. The shift rod 205 is held in the neutral position by the spring 207.

A fourth-speed switch 212 is attached to the body 10a on the left side in FIG. 2 and a fifth-speed switch 213 is attached to the body 10a on the right side in FIG. 2 so as to be situated on both sides of the head 205a along the sliding direction of the shift rod 205. The arrangement is such that the switches 212, 213 are turned on and off by being contacted by the head 205a as the shift rod 205 slides.

Figure 3:
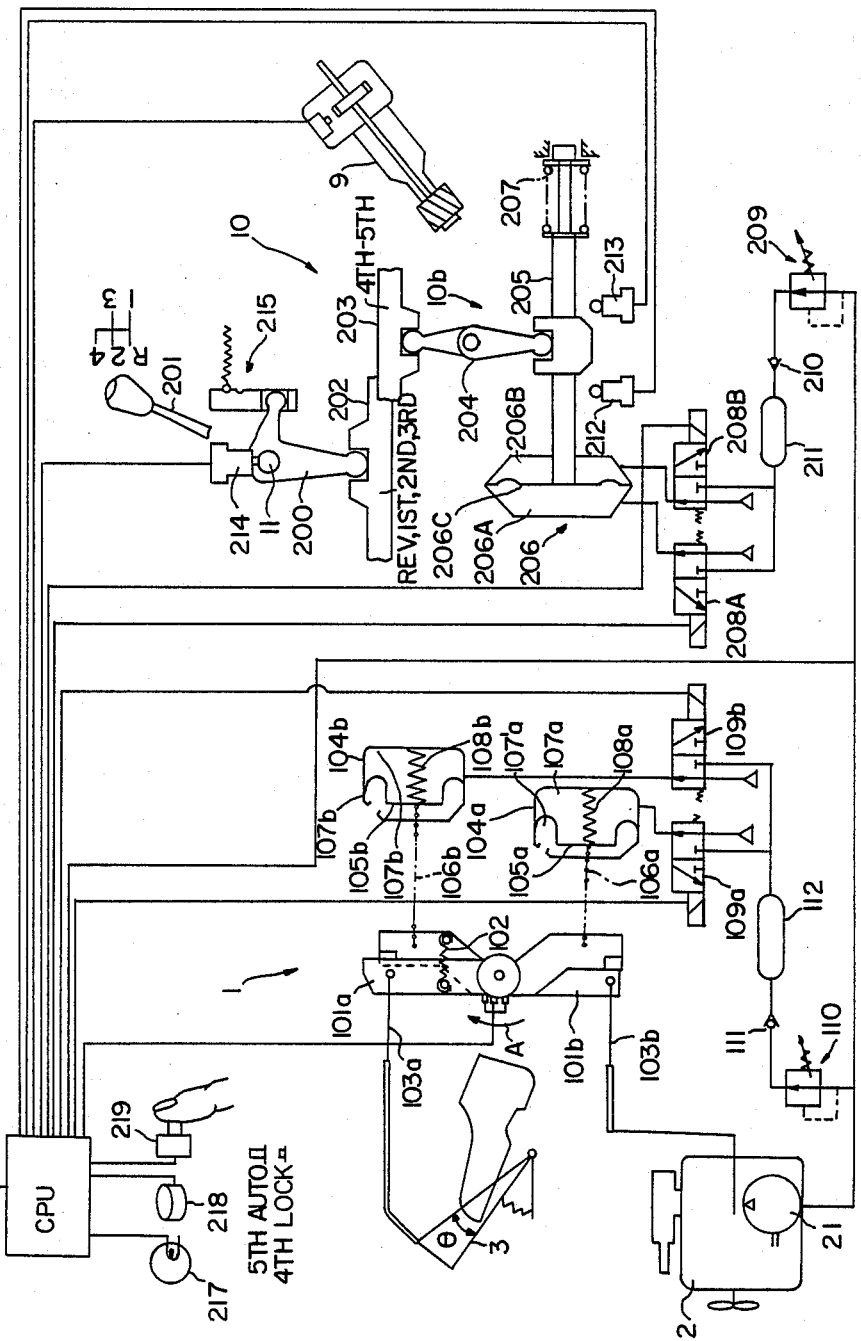
FIG. 3 is a block diagram illustrating an automatic shift mechanism including a shift actuator in accordance with the embodiment of the invention.

FIG. 3 illustrates the details of the automatic shift mechanism shown in FIG. 1 having the shift actuator of FIG. 2 as a component thereof.

With reference now to FIG. 3, the throttle actuator 1 includes a spring 102 interposed between two arms 101a, 101b pivotally supported at their respective centers. The accelerator pedal 3 is coupled to one end of one arm 101a by a wire 103a, and the end of the other arm 101b on the side opposite the abovementioned end of the arm 101a is coupled to the throttle of the engine 2 by a wire 103b. In ordinary operation of the accelerator, the arms 101a, 101b are swung in unison by the spring 102 in response to depression of the accelerator pedal 2, whereby the throttle is opened or closed.

A plate 105a, which is mounted in a case 104a by a diaphragm so as to be capable of moving freely, is coupled by a chain 106a to the end of the arm 101a opposite the wire 103a. The interior of the case 104a is partitioned into a pressure chamber 107a and a chamber 107'a by the plate 105a and the diaphragm.

A spring 108a is interposed between the plate 105a and the inner wall of the case 104a within the pressure chamber 107a, and the chamber 107'a is in communication with the atmosphere.

As in the case of the arm 101a, a plate 105b which, together with a diaphragm, partitions the interior of a case 104b into a pressure chamber 107b and a chamber 107'b, is coupled by a chain 106b to the end of arm 101b opposite the wire 103b, and spring 108b is loaded in the pressure chamber 107b.

The pressure chambers 107a, 107b are connected to the vacuum pump 21 by solenoid valves 109a, 109b, respectively. The solenoid valves 109a, 109b are adapted to communicate the pressure chambers 107a, 107b with the vacuum pump 21 (as a vacuum source) or the atmosphere in a switching manner. Operation of these solenoid valves is controlled by the CPU 6.

Connected between the solenoid vlves 109a, 109b and the vacuum pump 21 are a pressure regulating valve 110, a check valve 111 and a vacuum tank 112.

Numeral 200 denotes a manual shift arm so adapted that a fork shaft 202 is operated by manipulation of a shift lever 201 to enable a shift to reverse and to first through third forward speeds. The structure is similar to that of the prior art. A fork shaft 203 for fourth and fifth speeds is coupled to a shift rod 205 by a lever 204 pivotally supported at its central portion, with the arrangement being such that a shift is effected between fourth and fifth speeds by rocking the lever 204.

An actuator 206 having pressure chambers 206A, 206B defined by a diphragm 206C fixed to a rod 205 is attached to one end of the shift rod 205. A neutral return spring 207 for holding the shift rod at the neutral position is attached to the other end of the shift rod 205.

The pressure chambers 206A, 206B of the actuator 206 are connected to the vacuum pump 21 via a fourth-speed solenoid valve 208A and a fifth-speed solenoid valve 208B, respectively. The solenoid valves 208A, 208B, the operation whereof is controlled by the CPU 6, are adapted to communicate the pressure chambers 206A, 206B with the vacuum pump 21 or the atmosphere in a switching manner. Connected between the solenoid valves 208A, 208B and the vacuum pump 21 are a pressure regulating valve 209, a check valve 210 and a vacuum tank 211.

The shift rod 205 is provided with a fourth-speed switch 212 and a fifth-speed switch 213 for detecting when the shift rod 205 is slid to the fourth-speed position or fifth-speed position by operation of the actuator 206, and for supplying the CPU 6 with signals indicative of which of these positions the shift rod 205 occupies.

A fourth-speed select switch 214 inputs a fourth-speed shift signal to the CPU 6 when the shift lever 201 is shifted to the fourth-speed position. Numeral 215 denotes a feeling unit which functions when a shift is made to the fourth-speed position. Numeral 9 denotes a vehicle velocity sensor mounted on the transmission, 217 a fifth-speed indicator lamp, 218 a gear-shift chime, and 219 a mode switch.

Figure 4:
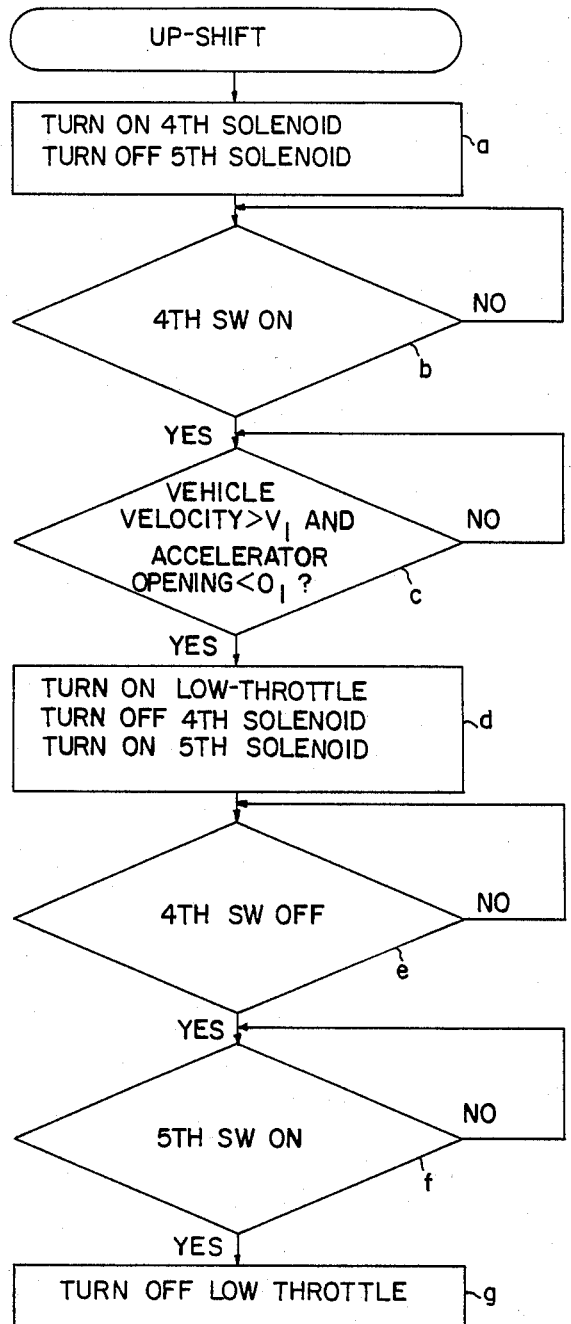
FIG. 4 is a flow chart illustrating operation of the embodiment at the time of an up-shift.
Figure 5:
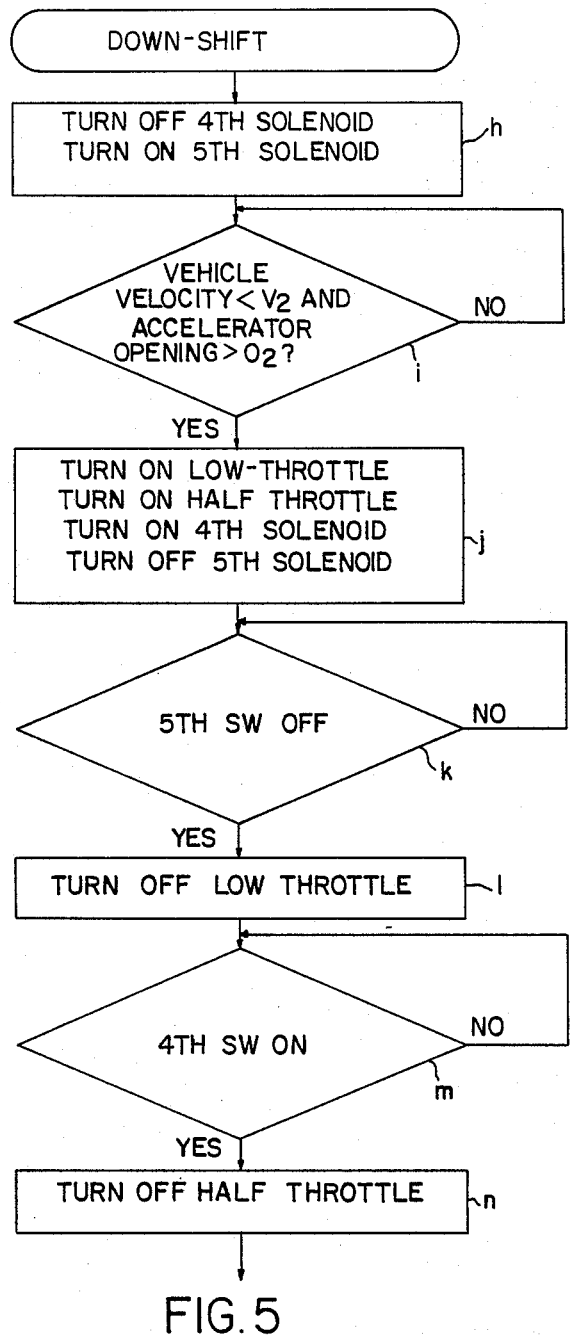
FIG. 5 is a flow chart illustrating operation of the embodiment at the time of a down-shift.

The operation of this automatic shift mechanism will now be described based on the flowcharts of FIGS. 4 and 5.

When the shift lever 201 is placed in the fourth-speed shift position, the fourth-speed lever switch 214 is turned on and produces a signal on the basis of which the CPU 6 turns on the fourth-speed solenoid valve 208A (step a) to communicate the pressure chamber 206A of actuator 206 with the vacuum pump 21, thereby bringing the pressure chamber to negative pressure. In response, the shift rod 205 is slid to the left in FIG. 3, so that the fork shaft 203 is moved to the fourth-speed side via the lever 204, whereby an up-shift to fourth speed is made. At this time the plate 221, engaging with the nut 205d, comes out of the plug 222 to compress the spring 207 as shown in FIG. 6. This up-shift to fourth speed is sensed by the CPU 6. This is accomplished by a signal which the fourth-speed switch 212 inputs to the CPU 6 upon sensing the sliding of the shift rod 205 to the fourth-speed side (step b).

When the vehicle accelerates while traveling in fourth speed and surpasses the prescribed velocity $V_1$ and, moreover, the accelerator opening falls below the prescribed opening $\theta_1$ (step c), the CPU issues a command in response to which the solenoid valve (low-throttle solenoid valve) 109b is turned on, the fourth-speed solenoid valve 208A is turned off and the fifth-speed solenoid valve 208B is turned on (step d).

In response to turn-on of the solenoid valve 109b, the pressure chamber 107b is evacuated to negative pressure by being communicated with the vacuum pump 21, so that the chain 106b is pulled to rotate the arm 101b in the direction of arrow A in FIG. 3, thereby reducing the throttle opening of the engine 2.

In response to turn-on of the fifth-speed solenoid valve 208B, the pressure chamber 206B of actuator 206 is now brought to negative pressure by being communicated with the vacuum pump 21, so that the shift rod 205 is urged rightward in FIG. 3. At the moment the rotational speed of the engine 2 drops due to the reduced throttle opening, the fork shaft 203 slips from fourth speed to neutral, the shift rod 205 is slid to the neutral position shown in FIG. 3, and the synchro is pressued against the fifth-speed gear. At the moment the engine rotational speed undergoes a further decline, the synchro acts in fifth speed, as a result of which the shift rod 205 slides further to the right in FIG. 7 to be situated at the fifth-speed position.

The shift from fourth speed to neutral and the shift from neutral to fifth speed are sensed by the CPU 6, since the fourth-speed switch 212 turns off (step e) and the fifth-speed switch 213 turns on (steps f). The solenoid valve 109b is turned off thereafter (step g), thereby completing the automatic up-shift to fifth speed (overdrive).

Next, when the fifth-speed solenoid valve 208B is turned on, the vehicle is decelerated from the overdrive traveling state (step h), the vehicle velocity V drops below the prescribed velocity $V_2$ and, moreover, the acceleration opening $\theta$ exceeds the prescribed opening $\theta_2$ (step i), the CPU 6 issues commands to turn on both the solenoid valves 109a, 109b, turn on the fourth-speed solenoid valve 208A and turn off the fifth-speed solenoid valve 208B (step j).

As in the case of the up-shift described above, the throttle opening is reduced by the rotation of the arm 101b in response to turn-on of the solenoid valve (low-throttle solenoid valve) 109b. Then, with the rotational speed of the engine having been reduced, the fourth-speed solenoid valve 208A is turned on to establish negative pressure in the pressure chamber 206A and, hence, urge the shift rod 205 leftward in FIG. 5. As a result, the shift slips from fifth speed to neutral and the synchro is pressed against the fourth-speed gear.

The fifth-speed switch 213 is turned off (step k) by sliding of the shift rod 205, in response to which the CPU 6 turns off the solenoid valve 109b (step 1) to open the throttle. When the engine rotational speed rises, the synchro comes into play in fourth speed to effect the down-shift to fourth speed. This down-shift to fourth speed is sensed by the fourth-speed switch 202, which turns on (step m). The CPU 6 thereafter turns off the solenoid valve (half-throttle solenoid valve) 109a (step n) to complete the down-shift.

Even if the driver removes his foot from the accelerator pedal 3 in the process of shifting down to fourth speed, the solenoid valve (half-throttle solenoid valve) 109a is at "on", thereby maintaining negative pressure in the pressure chamber 107a and rotation of the arm 101a in the direction opposite that of arrow A in FIG. 3. As a result, the accelerator opening is maintained at the prescribed opening necessary for the fourth-speed shift, so that an inability to shift to fourth speed is prevented.

In the embodiment of the invention set forth above, it is described that the shift actuator for the fourth speed—fifth speed shift is operated by air pressure. However, it is also possible to operate this actuator by controlling hydraulic pressure or else.

Figure 8:
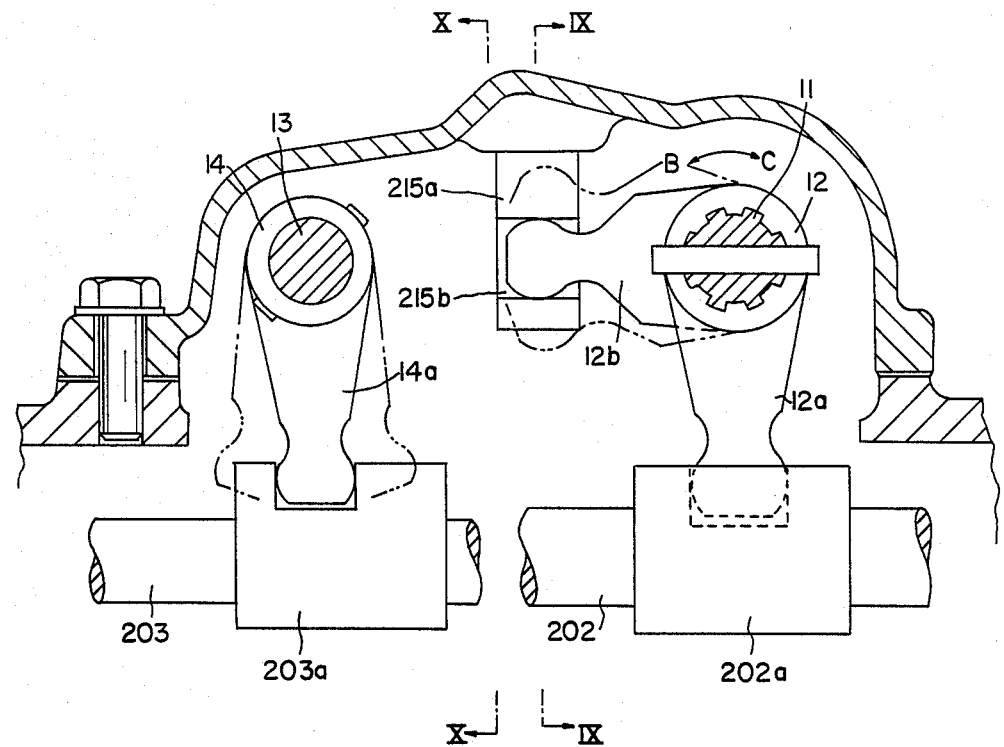
FIG. 8 is a sectional view illustrating a reversing device of a shift mechanism coupled to the shift actuator in accordance with the embodiment.
Figure 9:
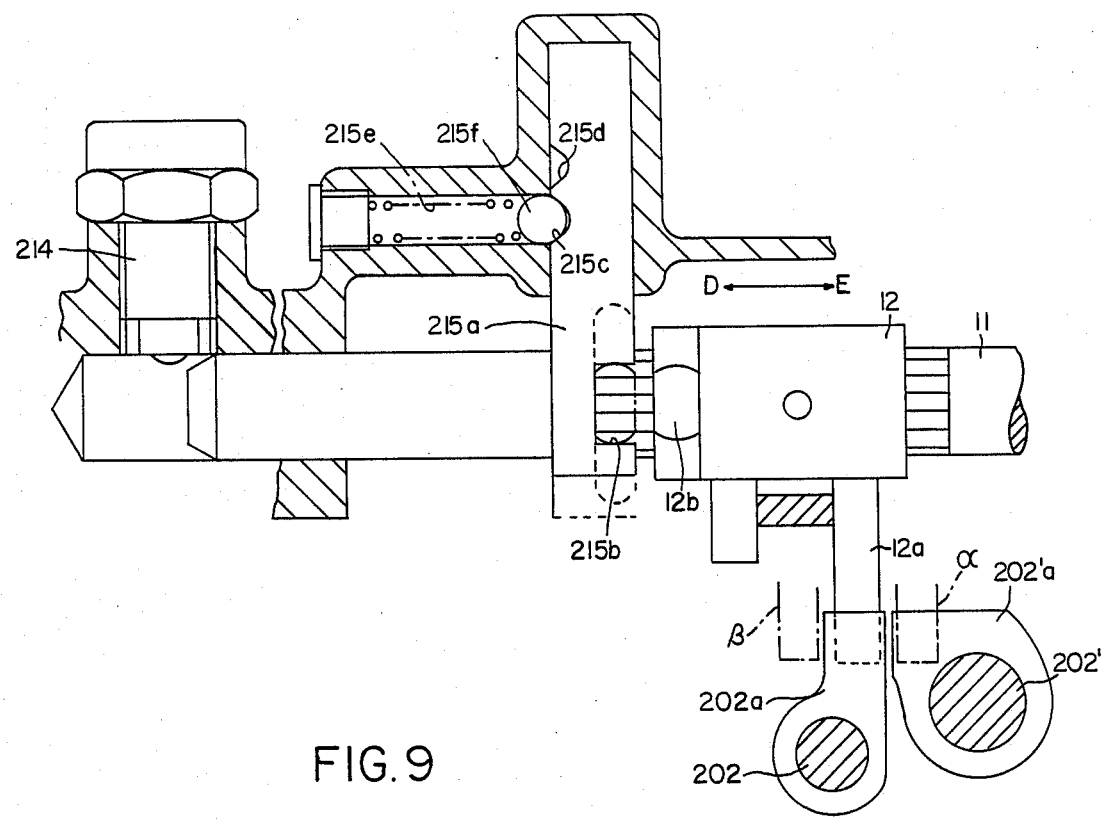
FIG. 9 is a sectional view taken along line IX—IX of FIG. 8.
Figure 10:
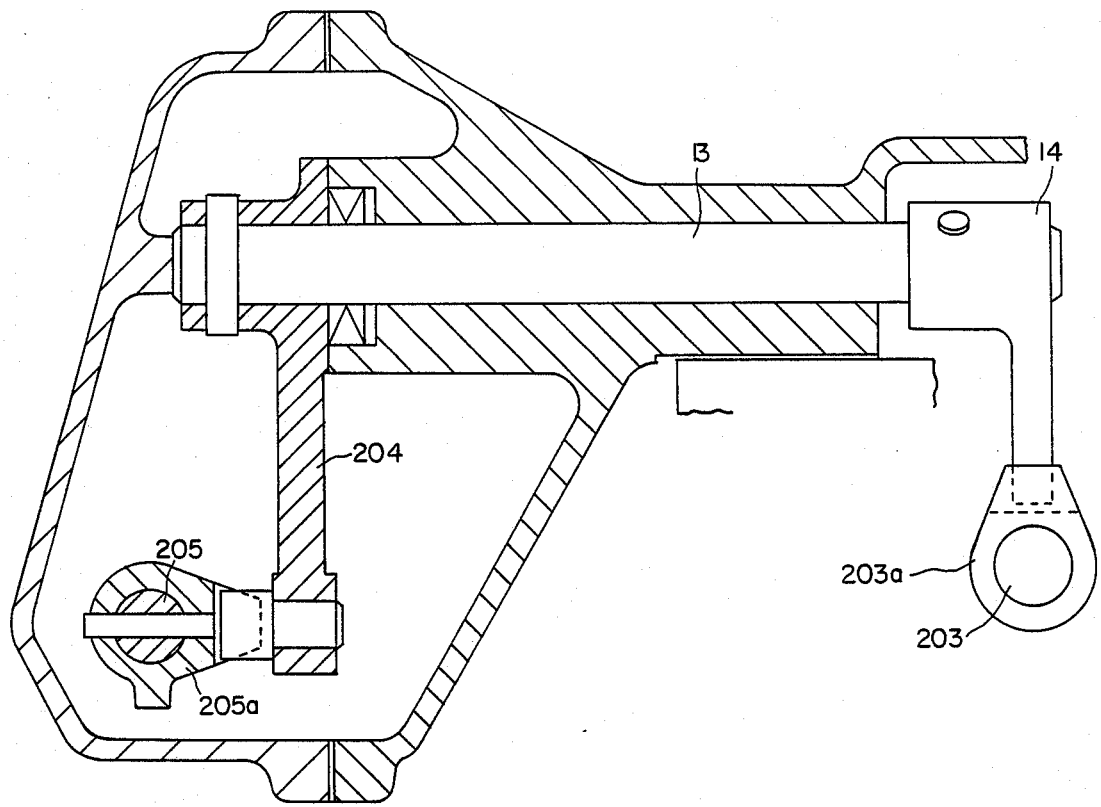
FIG. 10 is a sectional view taken along line X—X of FIG. 8.

FIGS. 8 through 10 illustrate a noval shift reversing device of the shift actuator 10 coupled to the fourth speed—fifth speed shift actuator of FIG. 2. A shift-and-select lever shaft 11 is arranged inside a housing so as to be rotated about its central axis by manipulating the shift lever 201. A shift inner lever 12 fitted onto the shaft 11 rotates together with shaft 11 by virtue of splining or other means and is capable of moving in the axial direction of the shaft 11.

The shift inner lever 12 has an arm 12a extending downwardly in FIG. 8, and an arm 12b extending leftward with an angle of about 90 degrees relative to the arm 12a. The distal end of the downwardly extending arm 12a is situated so as to be capable of engaging shift heads 202'a, 202a of a reverse—first speed fork shaft 202' and the second speed—third speed fork shaft 202, respectively. The distal end of the leftwardly extending arm 12b is situated in front of a recess 215b of a feeling lever 215a fitted so as to slide freely in the housing. The arrangement is such that the distal end of the arm 12b will fit into the recess 215b due to movement of the shift inner lever 12.

As shown in FIG. 9, two depressions 215c, 215d are formed on the side of the feeling lever 215a, and a ball detent 215f urged by a spring 215e is fitted under pressure in either the depression 215c or 215d.

The fourth-speed select switch 214 is arranged at a position at the distal end of the shaft 11 and is turned on by being contacted by the shaft 11 when the latter is slid to the fourth-speed position.

A shaft 13 is arranged in the housing so as to lie parallel to the shift-and-select shaft 11. Supported on the shaft 13 is a fourth speed—fifth speed lever 14 capable of rotating about its axis in unison with the shaft 13 and having an arm 14a extending downwardly in FIG. 8. The distal end of the downwardly extending arm 14a is in engagement with a shift head 203a of a fourth speed—fifth speed fork shaft 203 which performs a shifting operation.

As shown in FIG. 10, the lever 204 depicted in FIG. 2 is fitted securely on the end of shaft 13 opposite the side on which the fourth speed—fifth speed lever is attached. The distal end portion of the lever 204 is engaged with the head 205a of the shift rod 205, as mentioned above.

Assuming that the shift inner lever 12 in the above-described shift mechanism is in the select position for second speed and third speed, the distal end of the arm 12a will be in engagement with the shift head 202a of the fork shaft 202 for the second and third speeds, and the other arm 12b will be free (see FIG. 9). If the shift inner lever 12 is shifted in the direction of arrow B under these condition, the fork shaft 202 moves rightward in FIG. 8 (i.e. in a direction for shifting to second speed). If the shift inner lever 12 is shifted in the direction of arrow C in FIG. 8 on the other hand, the fork shaft 202 moves leftward in FIG. 8 (i.e. in a direction for shifting to third speed).

Thus, a shift to second speed or third speed is achieved. A shift to first speed and reverse is achieved by sliding the shift inner lever 12 in the direction of arrow B in FIG. 9 (to the position indicated by the dsahed line $\alpha$) and then turning the lever 12 in either direction, just as in shifting to second speed or third speed as described above.

When the shift lever 201 is shifted to the fourth-speed shift position, the shift inner lever 12 is slid in the direction of arrow D in FIG. 9 together with the shaft 11, so that the arm 12a separates from the shift head 202a (to occupy the position indicated by the dashed line $\beta$) and the arm 12b is fitted into the recess 215b of feeling lever 215a. When the shift inner lever 12 is then rotated in the direction B and placed in the fourth-speed position, the feeling lever 215a slides so that the ball detent 215f gets unseated from the depression 215c and then seated in the depression 215d. This phenomenon is felt by the driver, who is thereby capable of sensing the shift to fourth speed.

In response to turn-on of the fourth-speed select switch 214 by the shaft 11, the shift rod 205 is slid in the fourth-speed direction, as mentioned earlier, so that the fourth—fifth speed fork shaft 203 is slid to the fourth-speed side via the lever 204, shaft 13, fourth—fifth speed lever 14 and fourth—fifth speed shift head 203a, thereby effecting the shift to fourth speed. The shift to fifth speed is performed automatically by sliding the shift rod 205 by means of the actuator 206 in the direction opposite that for the fourth-speed shift, as set forth above.

As many apparently widely different embodiments of the present invention can be made without departing from the spirit and scope thereof, it is to be understood that the invention is not limited to the specific embodiments thereof.

What is claimed is:

1. A shift actuator in an automatic shift mechanism of a geared transmission for an automotive vehicle, comprising:
    a casing;
    a shift member including a shift rod arranged in the casing so as to slide freely in opposite axially directions and being connected with a distal end of a lever coupled to a fork shaft for actuating the fork shaft by sliding in either of the opposite axial direction, thereby effecting a gear shift, the lever having a distal end portion pivotally supported on a head provided on said shift rod and a base portion fixed to one end of a shaft arranged to be rockable about its axis in the casing, a further lever engaged with the fork shaft being attached to the other end of said shaft;
    actuating means connected to said shift member for urging said shift member in either of said directions by fluid pressure; and
    control means for switching the fluid pressure.

2. The shift actuator according to claim 1, wherein said actuating means comprises piston means operatively connected to said shift member and actuated by the fluid pressure.

3. The shift actuator according to claim 2, wherein said actuating means comprises first and second pressure chambers defined by said piston means.

4. The shift actuator according to claim 1, wherein said control means comprises changeover valve means for switching the fluid pressure.

5. The shift actuator according claim 4, wherein said changeover valve means comprises first and second solenoid valves connected respectively to said first and second pressure chambers for switchingly connecting a pressure source to either of said first and second pressure chambers.

6. The shift actuator according to claim 5, wherein said pressure source is a vacuum source.

7. The shift actuator according to claim 6, wherein said vacuum source is a vacuum pump.

8. The shift actuator according to claim 1, wherein said first and second pressure chambers of said actuating means are partitioned from each other by a plate fixed to one end of said shift rod and a diaphragm attached to said plate, said plate being urged in mutually opposing directions by the fluid pressure applied thereto.

9. The shift actuator according to claim 8, wherein said shift rod has positioning means for positioning said shift rod at a neutral position.

10. The shift actuator according to claim 9, wherein said positioning means comprises a pair of plates penetrated by said shift rod and freely slidable in an axial direction of the shift rod, and a spring interposed between said plates for urging said plates away from each other, said pair of plates being restricted relative to the casing so as to define the neutral position of the shift rod.

11. The shift actuator according to claim 1, wherein a speed-change switch is arranged on both sides of the head, said shift rod contacting one of the speed-change switches to turn said switch on when said shift rod slides in either direction.

12. The shift actuator according to claim 1, wherein said head is provided on the central portion of said shift rod.

13. The shift actuator according to claim 1, wherein said control means comprises a computer for switching the fluid pressure on the basis of signals indicative of vehicle velocity and accelerator opening.

14. The shift actuator according to claim 13, wherein when said vehicle velocity is greater than a prescribed velocity and, moreover, accelerator opening is less than a prescribed first accelerator opening, said computer outputs a 15. A shift actuator in an automatic shift mechanism of a geared transmission for an automotive vehicle, comprising:
    a casing;
    a shift member arranged in the casing so as to slide freely in opposing directions and coupled to a fork shaft for actuating the fork shaft by sliding in either of said opposing directions thereby effecting a gear shift, said fork shaft being a second highest speed fork shaft and being actuatable independently of a fork shaft establishing at least one speed lower than the second highest speed;
    actuating means connected to said shift member for urging said shift member in either of said directions by fluid pressure; and
    control means for switching the hydraulic pressure.

16. The shift actuator according to claim 15, wherein said shift member comprises a shift rod arranged to slide freely axially thereof inside the casing, the shift rod being connected with a distal end of the lever coupled to the fork shaft.

17. The shift actuator according to claim 15, wherein said actuating means comprises piston means operatively connected to said shift member and actuated by the fluid pressure.

18. The shift actuator according to claim 15, wherein said control means comprises changeover valve means for switching the fluid pressure.

19. The shift actuator according to claim 15 wherein said control means comprises a computer for switching the fluid pressure on the basis of signal indicative of vehicle velocity and accelerator piston.

20. The shft actuator according to claim 15, wherein said highest speed is overdrive.

21. The shift actuator according to claim 15, wherein said highest speed is a fifth speed.

22. The shift actuator according to claim 15, wherein said shift actuator further includes means for releasing operative coupling of a shift lever from said fork shaft establishing the lower speed, and for operatively coupling the shift lever with said shift actuator.

23. The shift actuator according to claim 22, wherein said shift actuator further includes sensing means for sensing releasing of the shift lever from said fork shaft, said sensing means supplying a sensed signal to said control means.

24. The shift actuator according to claim 22, wherein said shift actuator further includes a neutral position.

25. The shift actuator according to claim 23, wherein said sensing means comprises a switch actuatable by a shift and select lever shaft upon its release from the coupling state with said fork shaft establishing the lower speed.

26. The shift actuator according to claim 22, wherein said shift actuator further includes feeling means for feeling a shift lever position establishing the second highest speed.

27. The shift actuator according to claim 26, wherein said feeling means comprises an engaging member with a shift inner lever of said releasing means, and a ball detent indicative of the second highest speed.

28. The shift actuator according to claim 15, wherein said at least one lower speed comprises two or more speeds.

29. The shift actuator according to claim 28, wherein said lower speed comprises three forward speeds and one reverse speed.

* * * * *